July 26, 1949.　　　S. W. RUSSELL　　　2,477,496
SAFETY AUXILIARY APPLICATION VALVE
Original Filed Dec. 3, 1946
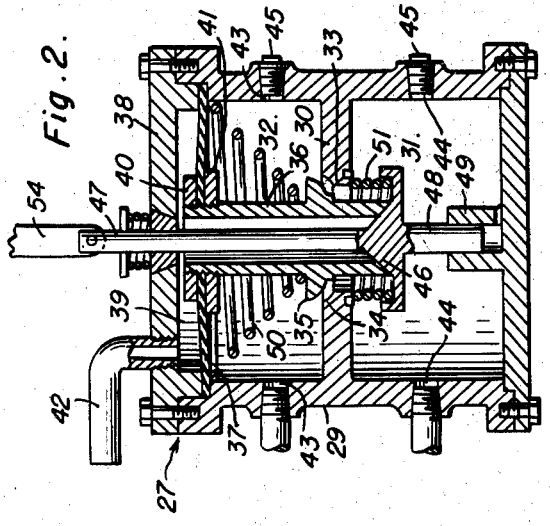
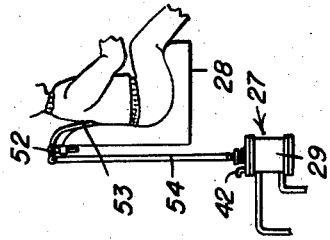
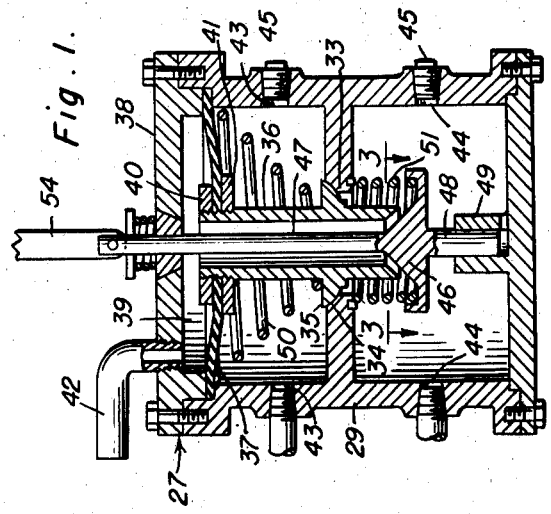
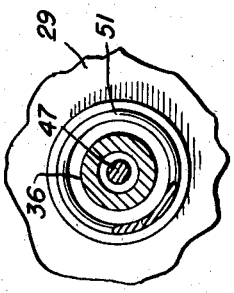
Sam W. Russell
INVENTOR.
BY Patented July 26, 1949

2,477,496

UNITED STATES PATENT OFFICE 2,477,496

SAFETY AUXILIARY APPLICATION VALVE

Sam W. Russell, Knoxville, Tenn.

Original application December 3, 1946, Serial No. 713,673. Divided and this application February 25, 1948, Serial No. 10,831

5 Claims. (Cl. 277—21)

1

This invention relates to tractor-truck and trailer brake equipment, and the present application is a division of my co-pending application for U. S. Letters Patent Serial No. 713,673, filed December 3, 1946.

The present invention has particular reference to a safety auxiliary application valve for installation in the emergency line of tractor-truck and trailer brake equipment, whereby to automatically vent the emergency relay valve to the atmosphere and thereby cause application of the trailer brakes in case the driver of the truck should lean or fall forward, while driving, due to falling asleep or becoming unconscious.

The primary object of the present invention is to provide a safety auxiliary application valve which, when installed in the emergency line of a tractor-truck and trailer brake equipment, will cause the trailer brakes to be released when the driver of the truck leans against the back of the driver's seat in proper position for driving, and will cause the trailer brakes to be applied if the driver of the truck should lean or fall forward, while driving, due to falling asleep or becoming unconscious.

A further object of the invention is to provide a safety application valve of the above kind which may be readily installed in existing brake equipments, which is highly efficient in operation, and which is comparatively simple in construction.

The exact nature of the present invention, as well as more specific objects and features thereof, will become apparent from the following description when considered in connection with the accompanying drawings, in which:

Figure 1 is a central vertical sectional view of a safety application valve constructed in accordance with the present invention and in its normal position.

Figure 2 is a view similar to Figure 1, showing the safety application valve in its operated condition.

Figure 3 is a fragmentary horizontal section taken on line 3—3 of Figure 1.

Figure 4 is a fragmentary somewhat diagrammatic side elevational view drawn on a reduced scale and showing the present application valve operatively associated with the driver's seat of a tractor-truck.

Referring in detail to the drawing, the present safety auxiliary application valve, indicated at 27, is adapted to be interposed in the emergency line of a tractor-truck and trailer brake equipment, and is adapted to be arranged on the tractor-truck near the driver's seat 28 of the latter, as disclosed in my above-mentioned co-pending application.

The present application valve 27 is preferably of the construction shown in Figures 1 to 3 inclusive and includes a suitable casing 29 divided by partition 30 into chambers 31 and 32. The partition 30 has a central opening 33 affording communication between the chambers 31 and 32, and a valve seat 34 is formed in the upper side of the partition 30 in surrounding relation to the opening 33. A valve head 35 is arranged to seat downwardly on the seat 34, and this valve head is provided on the intermediate portion of a vertical tubular stem 36 that extends through the opening 33 of partition 30. The margin of a diaphragm 37 is clamped between an internal shoulder of the casing 29 and a removable cover 38 of said casing, said diaphragm dividing the casing into a further small top chamber 39. The diaphragm 37 has a central opening which receives the upper end of the stem 36, and the inner margin of diaphragm 37 is clamped between nuts 40 and 41 threaded on the upper end of stem 36. Thus, the stem 36 provides for communication between lower chamber 31 and the top chamber 39, and the opening 33 provides for communication between the lower chamber 31 and the intermediate chamber 32. The cover 38 has a vent 42 which places the top chamber 39 in communication with the atmosphere. Casing 29 has a port 43 at each of opposite sides which open into the chamber 32, and a port 44 at each of opposite sides which open into the chamber 31. In use, the ports 43 and 44 at either side are used to install the valve in the emergency line of the brake equipment, the other two ports 43 and 44 being closed by plugs 45. A valve head 46 is arranged to seat upwardly against the lower end of the stem 36 within the lower chamber 31, and this valve head 46 is carried by the lower end of a vertical stem 47 which freely extends through the stem 36 and through the cover 38, and which is of considerably less diameter than the bore of stem 36. The valve head 46 has a central depending guide stem 48 slidably received in a tubular guide 49 provided on the bottom of the casing 29. The valve head 35 is normally yieldably seated by a spring 50, and the valve head 46 is normally unseated by a spring 51, so that communication between the chambers 31 and 32 is normally closed by the valve head 35, and the valve head 46 is normally unseated to establish communication between the chamber 31 and the chamber 39 through valve stem 36. In practice, the chamber 31 is placed in communication with the side of the emergency line which connects with an emergency relay valve, and the chamber 32 is connected with the side of the emergency line which communicates with a truck reservoir. It will thus be apparent that when the valve 27 is in its normal condition of Figure 1, the valve head 35 will close communication between the truck reservoir and the relay valve, and valve head 46 is unseated so as to vent the relay valve to the atmosphere through valve stem 36, chamber 39 and vent 42. This venting of the relay valve acts the same as a break in the emergency line and causes application of the trailer brakes exactly the same as an ordinary break in the emergency line will do. However, if the valve stem 47 is pulled upwardly against the action of springs 50 and 51 so as to seat the valve head 46 against the lower end of stem 36 and to unseat the valve head 35 as shown in Figure 2, communication will be established between the relay valve and the truck reservoir by way of opening 33, and communication of the relay valve with the atmosphere will be closed by seating of valve head 46 against the lower end of valve stem 36, thereby causing release of the trailer brakes.

Pivoted between its ends as at 52 to the top of the back rest of the driver's seat 28 is a lever 53, one arm of which is relatively long and extends forward and downwardly in front of and adjacent the upper portion of said back rest. The other shorter arm of lever 53 is connected by a link 54 with the upper end of valve stem 47. The arrangement is such that when the driver occupying the seat 28 leans backwardly against the back rest of seat 28 and assumes a proper position for driving, the long arm of lever 53 will be pressed rearwardly, so as to cause the link 54 to be pulled upwardly and thereby unseat valve head 35 and simultaneously seat valve head 46. In doing this, the spring 51 is compressed until the valve head 46 engages the lower end of stem 36, whereupon stem 36 is elevated and spring 50 is compressed. As before stated, this establishes communication between the truck reservoir and the relay valve by way of opening 33 as shown in Figure 2, simultaneously closing communication between chamber 31 and vent 42. This is the normal condition of the brake equipment in which the trailer and truck brakes are released, application of the trailer and truck brakes being normally effected by actuation of the conventional application valve, not shown. However, should the driver lean forward so as to release the lever 53 and permit the valve to assume its normal condition as shown in Figure 1, the relay valve will be vented to the atmosphere by way of chamber 31, stem 36, chamber 39 and vent 42, and communication will be simultaneously closed between the relay valve and the truck reservoir. This relieves the diaphragm of the relay valve from air pressure so as to cause air to be supplied to the trailer brake actuators and thereby applying the trailer brakes in a manner generally well known in the art with respect to the occurrence of an ordinary break in the emergency line of the equipment. As is also shown in my above-mentioned co-pending application, the present auxiliary application valve may be installed in a compressed air brake equipment or in brake equipment embodying hydraulic brakes on the tractor-truck actuated by a vacuum booster and vacuum brakes on the trailer.

From the foregoing description, the construction, operation and advantages of the present invention will be understood and appreciated by those skilled in the art. Modifications and changes in details of construction are contemplated within the spirit of the invention as claimed.

Having described the invention, what is claimed as new is:

1. A safety auxiliary application valve for tractor-truck and trailer brake equipment comprising a casing, a partition and a diaphragm dividing said casing into three compartments, means venting one of said compartments to the atmosphere, said partition having an opening and provided with a valve seat in surrounding relation to said opening, a valve member including a valve head arranged to engage the partition seat and a tubular open ended stem connected on one end to the diaphragm, said stem extending through the opening of the partition to provide communication between said one chamber and another of said chambers, the opening in the partition affording communication between said another chamber and the third remaining chamber of the casing, yieldable means normally acting to seat said valve head, a second valve head arranged to seat against said tubular stem to close communication between said another chamber and said one chamber, yieldable means to normally unseat said second valve head, and means including a back rest lever connected to said second valve head and operable for seating the latter against the tubular valve stem and then unseating the second valve head against the action of said first named yieldable means.

2. A safety auxiliary application valve for tractor-truck and trailer brake equipment comprising a casing, a partition and a diaphragm dividing said casing into three compartments, means venting one of said compartments to the atmosphere, said partition having an opening and provided with a valve seat in surrounding relation to said opening, a valve member including a valve head arranged to engage the partition seat and a tubular open ended stem connected at one end to the diaphragm, said stem extending through the opening of the partition to provide communication between said one chamber and another of said chambers, the opening in the partition affording communication between said another chamber and the third remaining chamber of the casing, yieldable means normally acting to seat said valve head, a second valve head arranged to seat against said tubular stem to close communication between said another chamber and said one chamber, and yieldable means to normally unseat said second valve head.

3. A safety auxiliary application valve for tractor-truck and trailer brake equipment comprising a casing, a partition and a diaphragm dividing said casing into three compartments, means venting one of said compartments to the atmosphere, said partition having an opening and provided with a valve seat in surrounding relation to said opening, a valve member including a valve head arranged to engage the partition seat and a tubular open ended stem connected at one end to the diaphragm, said stem extending through the opening of the partition to provide communication between said one chamber and another of said chambers, the opening in the partition affording communication between said another chamber and the third remaining chamber of the casing, yieldable means normally acting to seat said valve head, a second valve head arranged to seat against said tubular stem to close communication between said another chamber and said one chamber, yieldable means to normally unseat said second valve head, and means including a back rest lever connected to said second valve head and operable for seating the latter against the tubular valve stem and then unseating the second valve head against the action of said first named yieldable means, and means to facilitate interposition of the casing in the emergency line of the brake equipment with said another chamber and the remaining third chamber of the casing respectively communicating with the portions of the emergency line between which the casing is interposed.

4. A safety auxiliary application valve for tractor-truck and trailer brake equipment comprising a casing, a partition dividing said casing into a lower chamber and an intermediate chamber, a diaphragm dividing said casing into an upper chamber, means venting said upper chamber to the atmosphere, said partition having an opening and provided with a valve seat in surrounding relation to said opening, a valve member including a valve head arranged to engage the partition seat and a tubular open ended stem connected at one end to the diaphragm, said stem extending through the opening of the partition to provide communication between said lower chamber and said upper chamber, the opening in the partition affording communication between said lower chamber and said intermediate chamber, yieldable means normally acting to seat said valve head, a second valve head arranged to seat against the lower end of said tubular valve stem to close communication between the lower chamber and the upper chamber, yieldable means to normally unseat said second valve head, and operating means connected to said second valve head and operable for seating the latter against the tubular valve stem and then unseating the second valve head against the action of said first named yieldable means upon upward movement of said second valve head.

5. The construction defined in claim 4, wherein said operating means includes a back rest lever connected to said second valve head and adapted to be mounted adjacent the back rest of the driver's seat of the tractor-truck, whereby to raise the second valve head when said back rest lever is pressed rearwardly.

SAM W. RUSSELL.

No references cited.